March 21, 1950     C. F. DERBYSHIRE     2,501,034
EPICYCLIC GEAR

Filed Sept. 17, 1946

INVENTOR.
CHARLES F. DERBYSHIRE.
BY
Herbert E. Metcalf
Attorney

Patented Mar. 21, 1950

2,501,034

UNITED STATES PATENT OFFICE 2,501,034

EPICYCLIC GEAR

Charles F. Derbyshire, Inglewood, Calif., assignor to Northrop-Hendy Co., Hawthorne, Calif., a corporation of California Application September 17, 1946, Serial No. 697,475

5 Claims. (Cl. 74—801)

The present invention relates to transmission gearing, and more particularly to speed reduction gearing for use in aircraft between the engine shaft and the propeller. Such gearing is necessitated by the fact that the maximum and cruising power outputs of the larger engines, and particularly in the case of combustion gas turbines, are attained at higher rotative speeds than are feasible for direct propeller drive, hence it is the usual practice to employ reduction gearing of suitable ratio so that both the propeller and engine may operate at their respective design speeds.

The requirement of light weight and compactness in an aircraft transmission capable of carrying large powers at high rotative speed has led to the widespread use of epicyclic or spur planetary gear systems, comprising a sun gear, with a concentric ring gear, and a plurality of planet pinions disposed between and meshing with both of said gears. Either the sun or ring gear is held stationary, while the other is connected to the engine shaft and becomes the driver, the propeller being connected to the pinion carrier. This arrangement is extremely compact and has the advantage of theoretically dividing the torque load equally between several pinions, thereby reducing the tooth stresses and making it possible to use smaller gears with resultant saving in weight.

Since the minimum weight for such a unit can be achieved only be exploiting to the utmost the maximum strength of the materials used, these gears are designed to operate at high unit stresses, and the reserve strength for overload stresses is therefore low. Such overload stresses result from manufacturing errors in tooth spacing, pitch diameter of the planet pinions, angular spacing of the pinion journals, and pitch diameter concentricity of the sun gear, and these errors have been overcome to some extent in the past by such devices as the use of flexible sun gears and/or mountings, flexible trunnion supports for the planet gears, and flexible ring gear supports. The flexible ring gear support has proven to be fairly satisfactory and is now widely used in present day engines. The flexible trunnion support, on the other hand, is difficult to accomplish and for this reason has been used only to a limited extent. The flexible sun gear mounting has been achieved by providing large clearances in the sun gear bearing, if closely adjacent to the gear, or by mounting the sun gear on a flexible drive shaft. Both of the latter expedients have undesirable tendencies to set up vibration due to unbalance, and therefore appear to hold little promise for the future.

By far the most severe and troublesome condition, however, is the combination of poor trunnion spacing and lack of concentricity in the planet gear pitch diameter, or rolling diameter, as the case may be. The effect is to overload the pinion, resulting in trunnion bearing failure or pinion tooth failure, or in some cases, both.

The present invention has as one of its primary objects the provision of means for effectively overcoming the several errors mentioned above. This object is achieved by mounting each of the planet gears on its carrier so that a limited amount of movement is permitted in both circumferential and radial directions. Thus, any tendency on the part of the sun or ring gears to crowd the planet gear causes the latter to yield and move away from the crowding gear until the excessive tooth pressure is relieved and the torque load on the planet gear is restored to normal. In the preferred form of my invention, the planet gears are journaled on pins having coaxial trunnions at both ends thereof which are rotatably mounted in the planet carrier. The trunnions are ground eccentric with respect to the axis of rotation of the pinion, and the common axes of the trunnions are parallel at all times to the axes of the sun and ring gears. In the assembled unit of a gear train having substantially zero errors, the axis of the journal pin would be spaced somewhat outwardly and forwardly from the axis of the eccentric ends. However, if any of the several errors mentioned are present, the journal pin will tend to roll on its trunnions away from the improperly located position causing the overload to a position approximating the correct location for the pinion so that the latter is restored to its normal load condition without disturbing the parallel relationship of the axes of the trunnions with the axes of the sun and ring gears. Where the error is primarily one of trunnion spacing and the other errors are insignificant, the journal pin remains stationary in its new position, and the amount of displacement from the "normal" position represents approximately the amount of error in trunnion spacing. If, on the other hand, there are errors in tooth spacing, pitch diameter, or concentricity, the journal pin will oscillate on its trunnions to accommodate these errors as the gears revolve. Any binding effect due to cam action of the trunnion is held to an insignificant amount by the low degree of eccentricity used which, for most instances, will be of the order of the magnitude of the backlash of the gears.

Another object of the invention is to provide a gear transmission embodying the load equalizing feature described above, which is simple in construction and light in weight.

A further object is the provision of a load equalizing device characterized by smoothness of operation, reasonable oil flow requirements, and reduction of any tendency to set up vibration.

These and other objects and advantages of the present invention will become apparent as the following detailed description of the preferred embodiment thereof progresses, reference being had to the accompanying drawings, in which.

Figure 1:
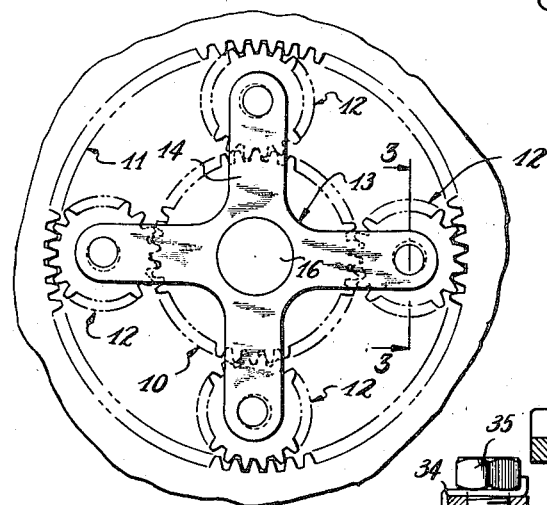
Figure 1 is an elevational view of an epicyclic gear transmission embodying the principles of the invention.

In the drawings, the reference numeral 10 designates the sun gear, while the ring gear is indicated at 11 and the planet pinions at 12. Only four planet pinions are shown, although it will be understood that in actual practice this number would be increased to the maximum that could be contained in the annular space between the sun and ring gears, since the more pinions which can be used, the greater the load carrying capacity of the transmission. Either the sun gear or ring gear may be connected to the drive shaft of the engine, while the other is suitably anchored to the transmission housing and remains stationary. For the sake of illustration, it will be presumed that the ring gear 11 is stationary and the sun gear 10 is connected to the engine shaft and serves as the driver.

The planet pinions are journaled on a carrier 13 comprising a pair of spaced coaxial members 14 and 15 which may be in the shape of spiders, as shown, or circular disks fixedly mounted on a driven shaft 16.

The outer ends of the spider arms are bored at 20, and journaled within these bores are trunnions 21 formed at opposite ends of journal pins 22. The trunnions 21 are coaxial with their axes parallel to the axes of the sun and ring gears, and are ground eccentric to the axis of the journal pin by an amount not exceeding the backlash of the gears which, for a gear mechanism of the size under consideration, is in the neighborhood of .005 to .010 inch. The amount of eccentricity may be considerably less than this maximum figure, however, since the tolerances for the tooth spacing, pitch diameter of the pinions, pitch diameter concentricity of the sun gear, and trunion spacing are usually of the order of .0003 to .0005 inch. By holding the amount of eccentricity to less than the amount of backlash in the gears, the journal pin is permitted to turn completely over more freely, with less crowding of the gear teeth.

The pinions 12 are journaled on the pins 22 between the carrier members 14 and 15 and mesh with both the sun gear 10 and ring gear 11. Rotation of the sun gear causes the pinions to rotate on their journal pins and to travel around the stationary ring gear.

Figure 2:
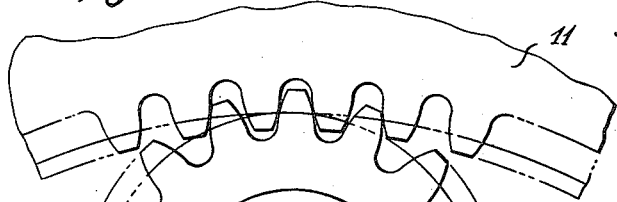
Figure 2 is an enlarged fragmentary view of one of the planet pinions.
Figure 3:
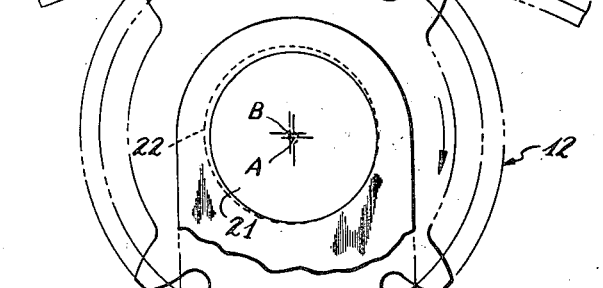
Figure 3 is a slightly enlarged sectional view taken along the line 3—3 in Figure 1.
Figure 3:
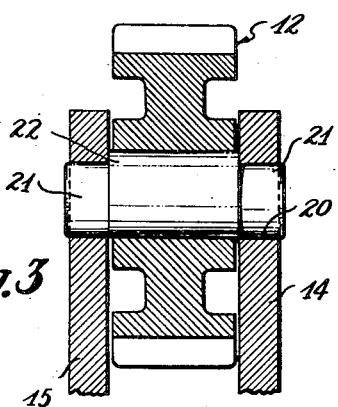

The operation of my invention is as follows:

If a gear unit could be produced having absolutely no errors in its component parts, the axes of the journal pin 22 and trunnions 21 would assume the positions indicated at A and B, respectively, in Figure 2, with the journal axis A disposed ahead of and radially outward from the trunnion axis B, the direction of rotation of the sun gear and planet pinions being indicated by the arrows. Such a unit is impossible of achievement, however, hence when any of the previously mentioned spacing errors are sufficient to produce a marked overloading of the pinion, the increased bearing pressure causes the journal pin to rotate on its trunnions in a direction to relieve the excessive pressure and thereby restore the torque load on the pinion to normal. The journal pin is freely rotatable on its trunnions at all times and, in extreme cases can turn completely over so that the journal axis trails the trunion axis. The position of the journal axis with respect to the trunnion axis is determined almost entirely by the load carried by the pinion, and no restoring device is required to return the journal pin to its initial position when the overloading condition has passed.

Figure 4:
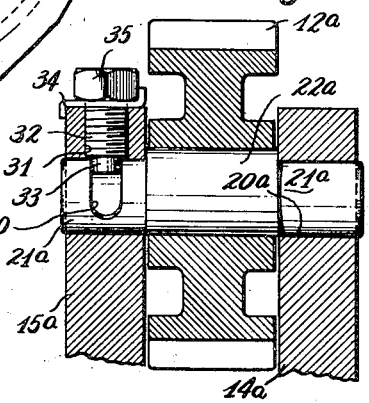
Figure 4 is a view similar to Figure 3 of a slightly modified form of the pinion and carrier, shewing a limit stop for limiting the rotation of the journal pin on its trunnions.

Illustrated in Figure 4 is a modified form of the invention embodying means for limiting the rotation of the journal pin on its trunnions. Such limit stop means might be found desirable under certain conditions where there is a tendency of the unit to set up an harmonic vibration at certain speeds or when the speed is changing. A condition of this kind might exist where the type and distribution of errors are of such a nature as to cause all of the journal pins to revolve continuously on their trunnions, resulting in a rolling displacement of the pinion carrier or sun gear, and the solution to the problem lies in the provision of means for preventing rotation of the journal pin on its trunnions through 360 degrees.

To this end, one of the trunnions 21a has a groove 30 milled into its periphery and extending circumferentially around the same somewhat less than 360 degrees. While the length or angular extent of the groove 30 is not particularly critical, it is believed that 270 degrees will provide adequate rotation of the journal pin for all practical purposes. A tapped hole 31 is provided in the outer end of the member 15a, and threaded into this hole is a set screw 32 having a smooth cylindrical stud 33 projecting from the bottom end thereof which extends down into the groove 30. The stud 33 is engageable with the ends of the groove 30 to limit rotation of the trunnion 21a, and in this way the journal pin is prevented from revolving through 360 degrees, although it is free to turn within the limits of the groove. The set screw 32 may be locked in place by any suitable means, such as a tab lock washer 34 located under the hexagonal head 35 of the set screw.

While I have shown and described in considerable detail what I believe to be the preferred form of my invention, it will be understood that various changes may be made in the shape and arrangement of the several parts without departing from the broad scope of the invention as defined in the following claims.

I claim:

1. In an epicyclic gear, the combination of a sun gear and a ring gear rotating around a common axis, and a plurality of planet gears disposed in the space between and meshing with said sun and ring gears, a carrier for said planet gears comprising a pair of spaced members mounted to rotate around the axis of said sun and ring gears and having a plurality of pairs of coaxial bores therein and a plurality of journal pins having coaxial eccentric trunnions at the ends thereof, the axes of said bores, said journal pins and said trunnions being parallel to the axis of said sun and ring gears, each of said journal pins being journalled in a pair of said coaxial bores and freely rotatable therein, one of said planet gears being journalled on each of said journal pins between said carrier members, each of said journal pins being free to turn on its trunnions independently and solely in response to excessive tooth pressures imparted to a planet gear mounted thereon to relieve said excessive pressures and to equalize tooth pressures on all of said planet gears and over the full engaged tooth lengths of said gears.

2. Apparatus in accordance with claim 1, wherein said trunnion is free to rotate over an arc wherein the change in position of said pinion due to said escentricity is not greater than the amount of backlash in the gears.

3. Apparatus in accordance with claim 1, wherein means are provided on said carrier to limit the free rotation of said trunnions to an arc less than 360°.

4. Apparatus in accordance with claim 1, wherein means are provided on said carrier to limit the free rotation of said trunnions to an arc greater than that of the useful range of said eccentricity and less than an arc providing a repetition of said range in the same direction.

5. Apparatus in accordance with claim 1, wherein means are provided on said carrier to limit the rotation of said trunnions to an arc preventing a cyclic repetition of the useful range of the eccentricity of said trunnions.

CHARLES F. DERBYSHIRE.

REFERENCES CITED

The following references are of record in the file of this patent:

UNITED STATES PATENTS

| Number | Name | Date |
|---|---|---|
| 1,435,021 | Omdal | Nov. 17, 1922 |
| 1,968,604 | Hertz et al. | July 31, 1934 |
| 2,043,261 | Neuland | June 9, 1936 |
| 2,144,937 | Ryder | Jan. 24, 1939 |

FOREIGN PATENTS

| Number | Country | Date |
|---|---|---|
| 255,064 | Italy | Oct. 6, 1927 |